US007995926B2

(12) United States Patent
Mendenhall

(10) Patent No.: US 7,995,926 B2
(45) Date of Patent: Aug. 9, 2011

(54) SCANNED ACQUISITION USING PRE-TRACK DATA

(75) Inventor: Todd L. Mendenhall, Rancho Palos Verdes, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 2681 days.

(21) Appl. No.: 10/371,490

(22) Filed: Feb. 21, 2003

(65) Prior Publication Data
US 2004/0165892 A1 Aug. 26, 2004

(51) Int. Cl.
*H04B 10/00* (2006.01)
(52) U.S. Cl. .......................... 398/123; 398/122; 398/131
(58) Field of Classification Search .................. 398/131, 398/122, 123, 158, 119, 151, 156, 159, 167; 250/491.1; 455/517
See application file for complete search history.

(56) References Cited

U.S. PATENT DOCUMENTS

| 4,969,159 A | 11/1990 | Belcher et al. ................ 375/153 |
| 5,056,736 A * | 10/1991 | Barton .......................... 244/3.13 |
| 5,103,459 A | 4/1992 | Gilhousen et al. ............ 370/206 |
| 5,109,390 A | 4/1992 | Gilhousen et al. ............ 370/335 |
| 5,228,054 A | 7/1993 | Rueth et al. ................... 708/252 |
| 5,475,520 A | 12/1995 | Wissinger |
| 5,506,865 A | 4/1996 | Weaver, Jr. .................... 398/118 |
| 5,577,025 A | 11/1996 | Skinner et al. ................ 370/335 |
| 5,583,513 A * | 12/1996 | Cohen ...................... 342/357.06 |
| 5,644,591 A | 7/1997 | Sutton ........................... 585/522 |
| 5,691,974 A | 11/1997 | Zehavi et al. ................. 132/277 |
| 5,790,588 A | 8/1998 | Fukawa et al. ................ 370/203 |
| 6,128,332 A | 10/2000 | Fukawa et al. ................ 375/148 |
| 6,381,055 B1 * | 4/2002 | Javitt et al. .................... 398/131 |
| 6,493,376 B1 | 12/2002 | Harms et al. .................. 375/146 |
| 6,775,480 B1 * | 8/2004 | Goodwill ....................... 398/158 |

FOREIGN PATENT DOCUMENTS

| EP | 1 130 809 A2 | 5/2001 |
| WO | WO 98/21704 | 5/1998 |

OTHER PUBLICATIONS

Dreisewerd, D.W. et al., "A Twice Synchronous Range GEO to GEO Optical Intersatellite Link (IU)"; Military Communications Conference 1992, IEEE San Diego, CA, Oct. 11-14, 1992, New York, NY, IEEE US, Nov. 11, 1992, pp. 177-182, XP010060959.

* cited by examiner

*Primary Examiner* — Ken N Vanderpuye
*Assistant Examiner* — Danny W Leung
(74) *Attorney, Agent, or Firm* — John A. Miller; Miller IP Group, PLC

(57) ABSTRACT

A scan acquisition technique for acquiring terminals (62, 64) that does not rely on precise alignment between a sensor (66, 70) and a transmitter (68, 72) associated with the terminals (62, 64). The terminals (62, 64) separate uncertainty regions (76, 78) into a plurality of sections (88, 90). Scan beams (82, 84) include encoded information of what section (88, 90) the scan beam (82, 84) is currently scanning. Each terminal (62, 64) will eventually receive the scan beam (82, 84) of the other terminal (62, 64). When it does, it will encode its scan beam (82, 84) with both the outgoing code and the return code for that section (88, 90), so that when it's scan beam (82, 84) is received by the other terminal (62, 64), that terminal (62, 64) will know what scan section (88, 90) the other terminal (62, 64) is located.

18 Claims, 3 Drawing Sheets

SCANNED ACQUISITION USING PRE-TRACK DATA

BACKGROUND OF THE INVENTION

1. Field of the Invention

This invention relates generally to a system and method for acquiring a distant terminal for transmitting an optical data beam thereto and, more particularly, to a system and method for mutually acquiring two distant terminals, where each terminal simultaneously scans an uncertainty region in which the other terminal is located, and where the scan beams include both encoded information about which section of the uncertainty region the scan beam is currently scanning and the position in the uncertainty region decoded from the other scan beam at the time the terminal of origin was last illuminated.

2. Discussion of the Related Art

Optical beams are sometimes employed to transmit digital data between two distant sources or terminals, such as space-to-space and space-to-ground optical communications, at very low power levels. The optical data beams have low divergence, and thus have extremely narrow beamwidths (for example 1-20 microradians) when they reach the target terminal to operate at the desired low power level. The optical data beam impinges on a collection aperture on the terminal. Conventional optics are used to focus the optical beam onto a detector to extract the data.

When the terminals wish to exchange data, and currently aren't tracking each other, an acquisition technique is employed to align the terminals so that the optical beam is transmitted in the proper direction with high accuracy. First, both terminals are informed of the general vicinity of the other terminal, defined herein as an uncertainty region. The uncertainty region is much larger than the angular beamwidth of the communications data beam. The terminals then initiate the acquisition process so that at the conclusion, their beam is pointed directly at the other terminal's telescope to exchange the data. During the acquisition process, information is exchanged between the two terminals until the uncertainty region is reduced to less than half the angular beamwidth of the data beam. If the incoming and outgoing beams are perfectly co-aligned, tracking can then commence to maintain the alignment. Because the information extracted by a local sensor from the arriving beam only tells the direction of the incoming beam, a misalignment of greater than one-half of the beamwidth between the incoming and outgoing beam will result in a failure to achieve track even if the incoming beam knowledge is perfect.

FIG. 1 is an illustration of a communications system 10 for transmitting optical data between a first terminal 12 and a second terminal 20 some distance apart. The terminal 12 includes a telescope having a sensor 14 for receiving optical beams from the terminal 20 and a transmitter 16 for transmitting optical beams to the terminal 20. Likewise, the terminal 20 includes a telescope having a sensor 22 for receiving optical beams from the terminal 12 and a transmitter 24 for transmitting optical beams to the terminal 12.

The terminal 12 gives its best estimate of its location to the terminal 20, and the terminal 20 gives its best estimate of its location to the terminal 12 for subsequent data transmissions. However, neither of the terminals 12 and 20 will give their location to the other terminal 12 or 20 with a high enough accuracy. Therefore, the actual location of the terminals 12 and 20 is unknown to the other terminal 12 or 20 before a signal beam is acquired. The given position of the terminals 12 and 20 is shown here as terminals 12' and 20', which is some unknown distance from the actual location of the terminals 12 and 20. Thus, an uncertainty region 28 is defined for the terminal 12 in which the terminal 12 is located, and an uncertainty region 30 is defined for the terminal 20 in which the terminal 20 is located. For example, the uncertainty region 28 or 30 may be 100 times the diameter of the data beamwidth, which provides a factor of 10,000 times of total area. The expected location of the terminals 12 and 20 is set at the center of the uncertainty regions 28 and 30, respectively, in two dimensions.

The uncertainty region 28 is shown relative to the sensor 22 of the terminal 20', and the uncertainty region 30 is shown relative to the sensor 14 of the terminal 12'. The uncertainty defined by the uncertainty regions 28 and 30 includes both positional uncertainty and angular uncertainty. It is the angular uncertainty that causes the uncertainty regions 28 and 30 to be shown relative to the sensors 14 and 22 for the expected locations of the terminals 12' and 20'.

In one known acquisition technique, the uncertainty regions 28 and 30 are flooded with a beacon of light from the terminals 12 and 20, respectively, to determine the position of the other terminal 12 or 20 by looking for the direction of the other terminals flood beam. This technique requires a separate beam than the data beam, and is typically relatively slow at providing acquisition if the power levels are low. Particularly, because of the distance between the terminals, the sensors 14 and 22 see the other terminals flood beam as a point source on its detector, such as a charge coupled device (CCD) array. It may take a significant amount of time for the CCD array receiving the low level flood beam to integrate enough charge to provide an indication of the direction of the other terminals flood beam.

Some of the problems with beacon type acquisition have been alleviated by employing scan beams that scan the uncertainty regions 28 and 30, where the beams are detected by the sensors 14 and 22, respectively. FIG. 2 shows the system 10 where only the actual locations of the terminals 12 and 20 are provided for illustrating a scan acquisition technique. The terminal 12 transmits a scan beam 34 from the transmitter 16, having the same beamwidth as the data beam, that is scanned across the uncertainty region 30 to illuminate the terminal 20. At the same time, the terminal 20 transmits a scan beam 36 from the transmitter 24 that scans across the uncertainty region 28 to illuminate the terminal 12. Each time the scan beam 34 or 36 is received by the sensor 22 or 24 of the terminal 12 or 20, that terminal 12 or 20 knows the approximate direction of the other terminal 12 or 20 because of where the beam impinges the sensors field-of-view. Thus, the terminals 12 and 20 can home in on each other by receiving the other terminals scan beam 34 or 36 until acquisition is completed. This occurs when the uncertainty regions 28 and 30 are reduced to less than half the beamwidth of the scan beams 34 and 36.

FIG. 3 depicts the terminals 12 and 20 after being acquired by the scan beams 34 and 36, after which the terminals 12 and 20 can track each other to maintain the pointing in the event that one or both of the terminals 12 or 20 is moving. Because the terminals 12 and 20 are simultaneously scanning for the other terminal 12 or 20, the average acquisition time can be reduced because once one terminal 12 or 20 is illuminated by the other terminal 12 or 20 its uncertainty area is reduced allowing it to acquire faster.

Recent improvements have been made in the known scan acquisition techniques to more quickly acquire the terminal of interest. Particularly, U.S. patent application Ser. No. 09/481,924 titled "Satellite Optical Communication Beam Acquisition Techniques," filed Jan. 13, 2000, assigned to the Assignee of this application and herein incorporated by reference, discloses one improvement. In this scan acquisition technique, the position of one terminal is determined by subdividing a sensor of the other terminal into sensor quads, and then continually subdividing each sensor quad after the terminal receives the scan beam until acquisition.

The operation of this acquisition technique will be discussed herein with reference to the terminal 12, the sensor 14 and the scan beam 36 from the terminal 20. FIG. 4 shows a sensor 40, representing the sensor 14 that is applicable for this purpose. The '924 application used a sensor divided into sensor quads for two-dimensional acquisition. However, for illustration purposes, this technique can be shown in only one-dimension with the sensor 40. The sensor 40 is separated into a first sensor half 42 and a second sensor half 44 separated by a line 46. The sensor halves 42 and 44 only determine if the scan beam 36 arrives through the portion of the uncertainty region 28 being watched by that sensor half. Because there are only two cells, high performance materials and electronics can be used to maximize sensitivity and minimize noise at reasonable cost. A CCD with the same level of performance would be extremely expensive. One example of a sensor suitable for this purpose is an InGaAs cell, well known to those skilled in the art.

As the scan beam 36 scans the uncertainty region 28, the scan beam 36 will eventually impinge the sensor 14. The sensor 40 includes suitable circuitry to determine which sensor half 42 or 44 is illuminated by the scan beam 36 (referred to as a "hit"). The sensor 40 will then adjust its field-of-view so that the line 46 falls half-way through the portion of the uncertainty region 28 that was previously covered by the sensor half 42 or 44 that was "hit" by the scan beam 36. For example, if the field-of-view of the sensor 40 is 16°, and the scan beam 36 is detected by one of the sensor halves 42 or 44, the sensor 40 will then move the center of its field-of-view to bisect the portion of the original field-of-view covered by the particular sensor half 42 or 44 that detected the beam 36.

By positioning the sensor 40 at the field-of-view for the sensor half 42 or 44, the uncertainty region 28 is cut in half, and now this half is covered by both of the sensor halves 42 and 44 around the line 46. When the sensor 40 is illuminated by the scan beam 36 again, it will again hit one of the two sensor halves 42 or 44, and thus the field-of-view can be divided in half again. This process is continued until the scan beam 36 is simultaneously detected by both sensor halves 42 or 44 at the line 46. For a two-dimensional scan, a quad cell sensor would be employed in this manner.

Once the uncertainty region 28 is reduced to half of the beamwidth of the scan beam 36, the transmitter 16 of the terminal 12 should be aligned with the sensor 22 of the terminal 20. However, the process described above requires that the sensor 14 be accurately aligned with the transmitter 16 because the transmitter 16 transmits the scan beam 34 in the direction just determined by the sensor 14. Misalignment between the sensor 14 and the transmitter 16 will induce an undetectable bias in uncertainty region 28 which may be greater than one-half of the beamwidth. Therefore, it is necessary to precisely align the transmitted beam to the center of the sensors field-of-view using precise alignment devices or applying an extremely stable structure.

SUMMARY OF THE INVENTION

In accordance with the teachings of the present invention, a scan acquisition technique is disclosed for acquiring two communications terminals that does not rely on precise alignment between a sensor and a transmitter associated with each terminal. The terminals are located within known uncertainty regions. The uncertainty regions are separated into a plurality of scan sections where each section is designated by a code. The scan beams include "forward" encoded information about what scan section the scan beam is currently scanning within the uncertainty region. As one terminal scans the uncertainty region trying to illuminate the other terminal, it will eventually receive the scan beam from the other terminal. When it does receive the other terminals scan beam, it will then decode the "forward" encoded information. The scan beam will contain two pieces of information. The first is the forward encoded information and the second is "return" information containing the decoded data from the terminal of origin. Thus, when the terminal of origin receives the scan beam, that terminal will know what scan section of the uncertainty region it was in when it successfully illuminated the other terminal.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a scan acquisition technique for acquiring optical terminals is merely exemplary in nature, and is in no way intended to limit the invention or its applications or uses.

Figure 1:
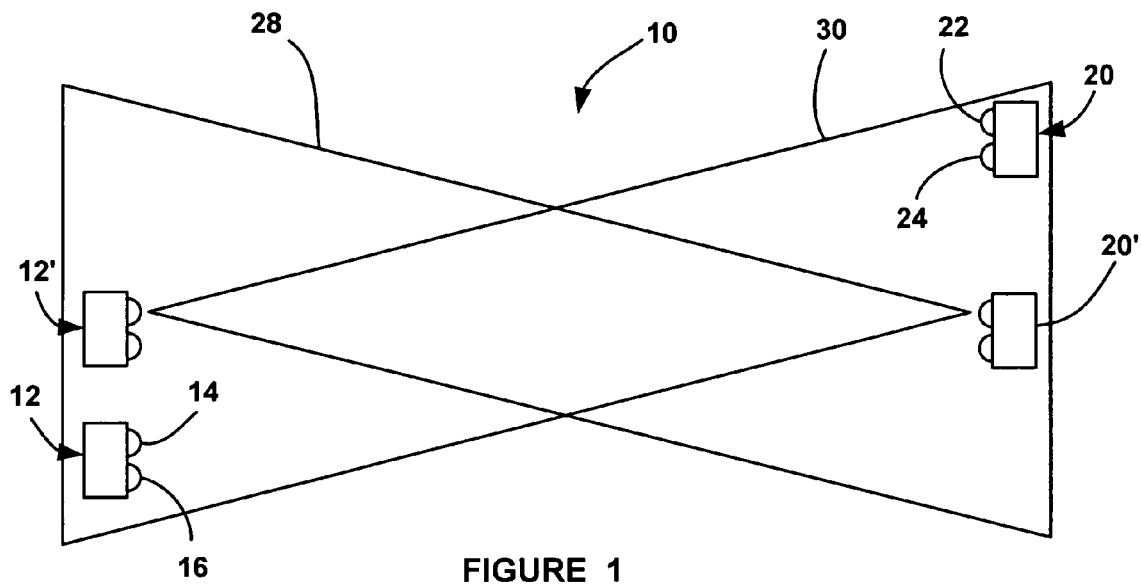
FIG. 1 is an illustration of a communications system employing communications terminals positioned in uncertainty regions.
Figure 2:
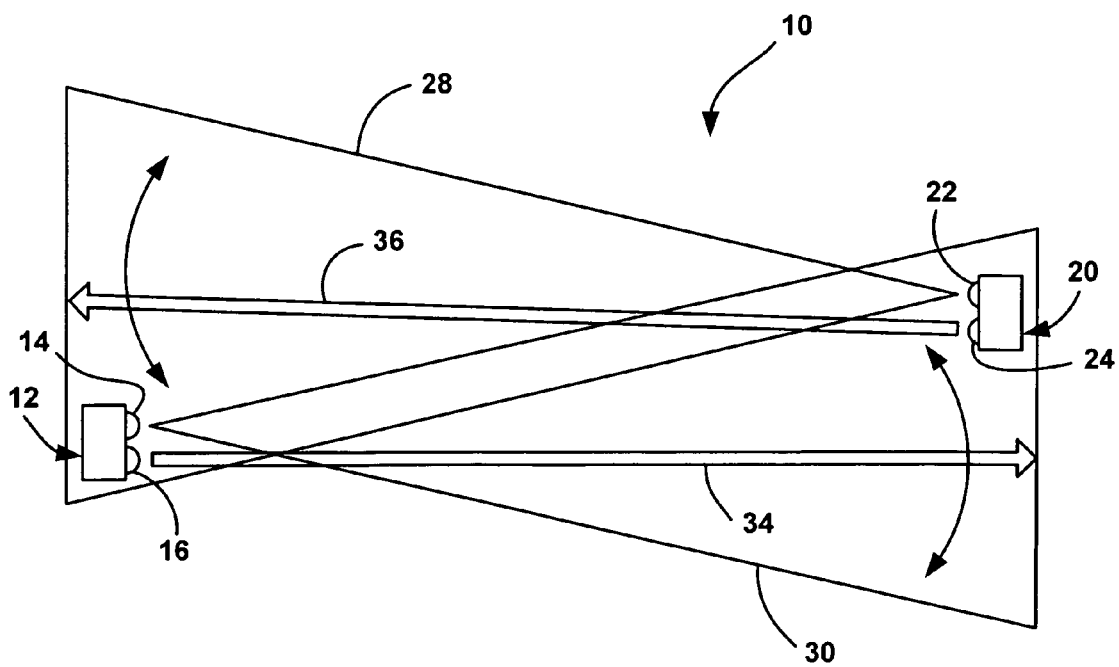
FIG. 2 is an illustration of the communications system shown in FIG. 1 depicting the terminals scanning the uncertainty regions with a scan beam for acquisition purposes.
Figure 3:
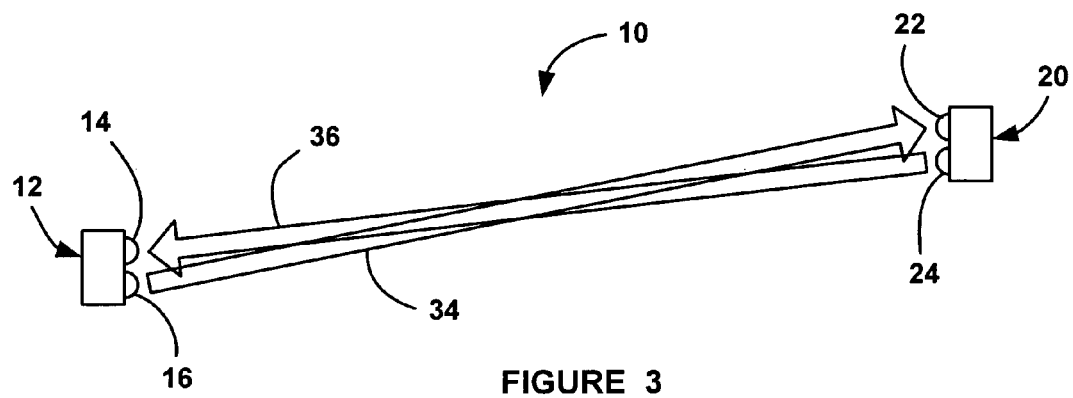
FIG. 3 is an illustration of the communications system shown in FIG. 1 where the two terminals have acquired each other so that the uncertainty region is reduced to half of the scan beamwidth.
Figure 4:
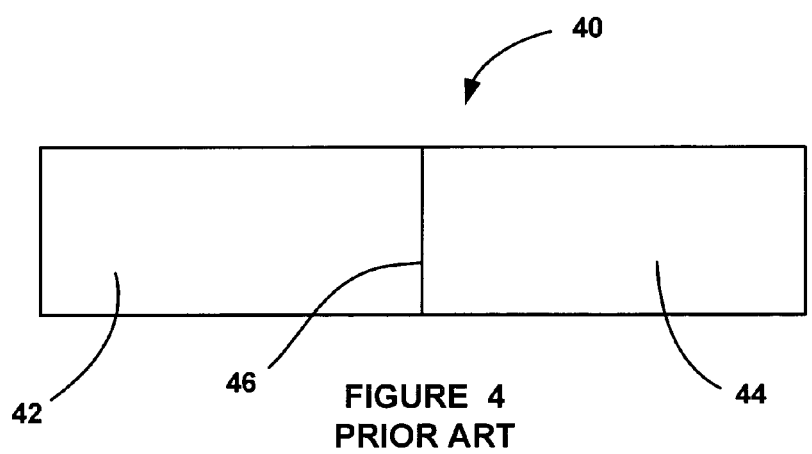
FIG. 4 is a depiction of a sensor having two sensor halves for use in a scan acquisition technique.
Figure 5:
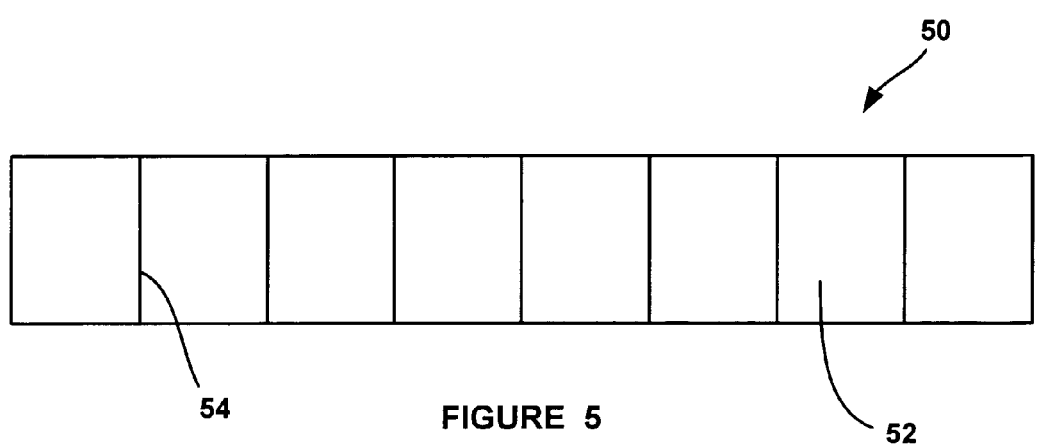
FIG. 5 is an illustration of a sensor including a plurality of sensor sections for use in a scan acquisition technique, according to an embodiment of the present invention.

According to one embodiment of the present invention, the sensors 14 and 22 are separated into a plurality of sensor sections to decrease the scanning acquisition time. For example, FIG. 5 shows a sensor 50 including eight separate sensor sections 52 separated by lines 54. As above with the sensor 40, when the sensor 14 or 22 receives the scan beam 36 or 34, respectively, the particular sensor section 52 that receives the beam 36 or 34 provides an indication of which direction the scan beam came from. Therefore, the uncertainty region 28 or 30 for the particular terminal 12 or 20 can be reduced to the size of that section 52, here ⅛ of the original size of the uncertainty region 28 or 30. For example, if the original uncertainty region 28 or 30 is 16°, the first hit allows the uncertainty region 28 or 30 to be reduced to 2°. Thus, the first time that the sensor 50 receives the scan beam 34 or 36, the uncertainty region 28 or 30 can be considerably reduced beyond that for the sensor 40 including the two sensor halves 42 and 44.

The sensor field-of-view of the sensor 50 is then moved so that one of the lines 54 falls at the center of that section 52 that previously received the scan beam 34 or 36. Therefore, only two of the sensor sections 52 are employed and the remaining sensor sections 52 are not used. Also, once the first section 52 is determined, then that section 52 can only be divided in half for each subsequent hit. If too many sensor sections are employed, then the same problem of using a sensor that is relatively unsensitive occurs. Also, the several circuits required to monitor more sensor sections becomes more complex. After the first hit, the many circuits that are required for the several sensor sections would not be used. This process continues until the uncertainty region 28 or 30 is reduced to one-half of the beamwidth of the scan beam 34 and 36. The improvement comes as a result of the reduction in the size of the uncertainty region 28 or 30 after the first initial detection of the scan beam 34 or 36.

Figure 6:
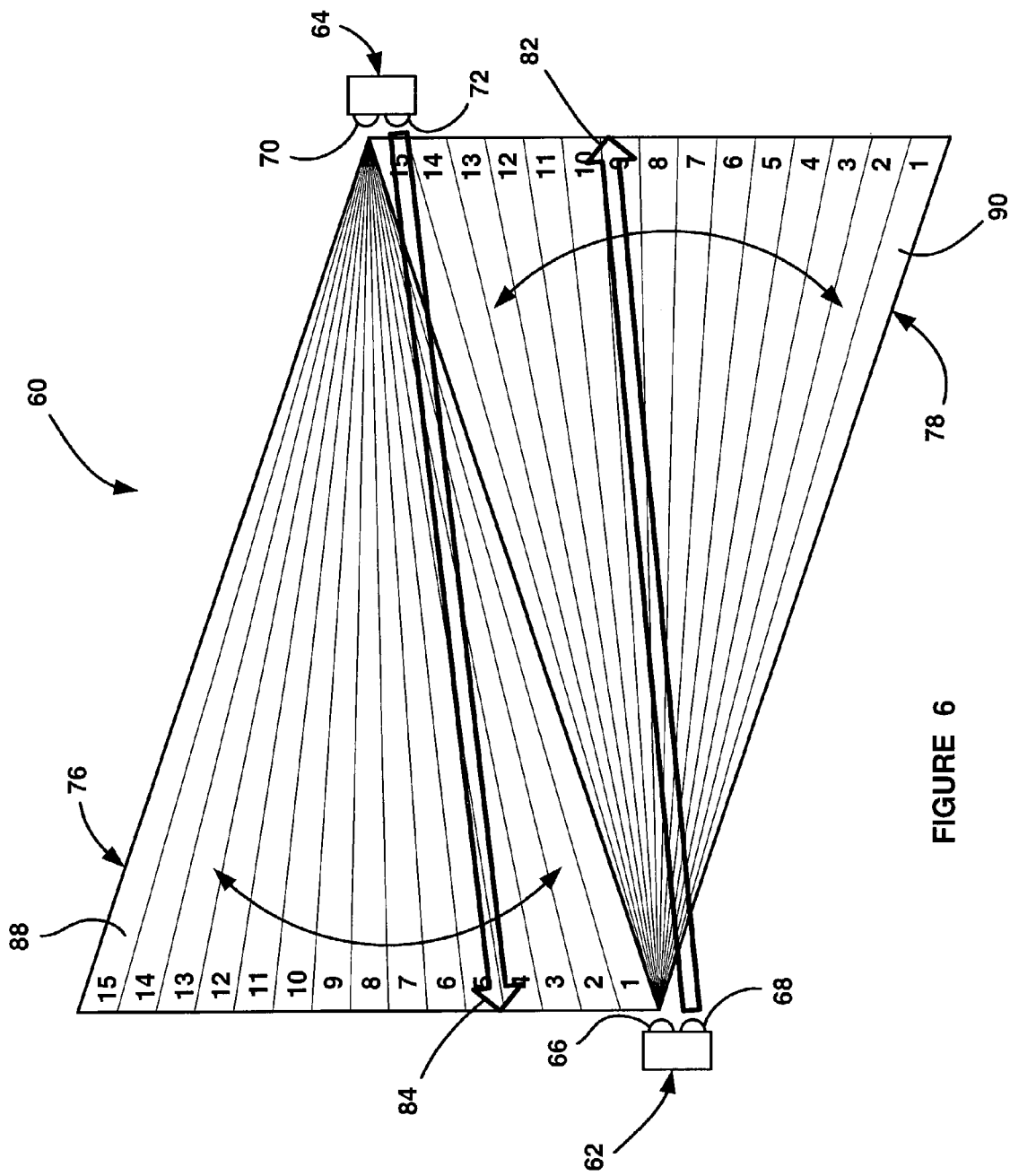
FIG. 6 is an illustration of a communications system employing a scan acquisition technique, according to an embodiment of the present invention.

According to the invention, a scan acquisition technique is disclosed that eliminates the requirement that the sensor and the transmitter be precisely aligned. FIG. 6 depicts a communications system 60 employing a first terminal 62 and a second terminal 64 that wish to communicate with each other through optical data beams. The terminal 62 includes a sensor 66 and a transmitter 68, and the terminal 64 includes a sensor 70 and a transmitter 72. At the initiation of the acquisition, it is known that the terminal 62 is positioned within an uncertainty region 76, and the terminal 64 is positioned within an uncertainty region 78. The transmitter 68 of the terminal 62 transmits a scan beam 82 that scans the uncertainty region 78 to be received by the sensor 70 of the terminal 64. Likewise, the transmitter 72 of the terminal 64 transmits a scan beam 84 that scans the uncertainty region 76 to be received by the sensor 66 of the terminal 62.

According to the invention, the uncertainty region 76 is separated into a plurality of contiguous scan sections 88, here fifteen. Likewise, the uncertainty region 78 is separated into a plurality of contiguous scan sections 90, also fifteen sections. Each scan section 88 and 90 is identified by a particular code, here a number from one to fifteen for simplicity purposes. Each section 88 and 90 represents the steering angle of the respective scan beam 82 and 84. The scan beams 82 and 84 are encoded with the specific scan section that they are currently scanning through. The scan beam 84 sequentially scans through all of the scan sections 88 of the uncertainty region 76, and the scan beam 82 sequentially scans through all of the sections 90 of the uncertainty region 78.

In this example, the terminal 62 is positioned within scan section 1 of the uncertainty region 76 and the terminal 64 is positioned within scan section 15 of the uncertainty region 78. However, this is for illustration purposes only. The scan beam 84 starts with scan section 1 of the uncertainty region 76, sequentially scans to scan section 15, and then returns to scan section 1. Likewise, the scan beam 82 starts with scan section 1 of the uncertainty region 78, sequentially scans to scan section 15, and then returns to scan section 1. The direction of the scan is also for illustration purposes.

Each time the scan beam 84 or 86 moves from one scan section 88 or 90 to the next scan section 88 or 90, it is encoded with the code for that section. For example, when the terminal 64 begins its scan in scan section 1 of the uncertainty region 76, the scan beam 84 is encoded with the number for that section 88. Because the terminal 62 is located in scan section 1, the sensor 66 of the terminal 62 receives the scan beam 84 and decodes the section code therefrom. The terminal 62 then encodes its scan beam 82 with both the outgoing section code and the decoded section code 1 just received from the scan beam 84. However, the terminal 64 does not receive the scan beam 82 until it reaches scan section 15 of the uncertainty region 78.

When the scan beam 82 does reach scan section 15 of the uncertainty region 78, it is still coded with both the outgoing section code 15 and the return scan section code 1 from the uncertainty region 76. Because the terminal 64 is located in scan section 15, it receives and decodes the scan beam 82 and now knows which section 88 the terminal 62 is located. Further, when the sensor 70 of the terminal 64 receives the scan beam 82, the terminal 64 encodes its scan beam 84 with both the outgoing section code 1 and the return section code 15 of the uncertainty region 78. Thus, when the scan beam 84 returns to scan section 1 of the uncertainty region 76, the terminal 62 will now know that the terminal 64 is in scan section 15.

Each time the terminals 62 and 64 know what scan section 88 or 90 the other terminal 62 or 64 is located, the uncertainty regions 76 and 78 are reduced to the size of that section 88 or 90. That section 88 or 90 is then subdivided fifteen times where each scan section 88 or 90 is again designated by the particular code. Thus, each time the data makes a round trip, the uncertainty regions 76 and 78 are reduced by $\frac{1}{15}$. This process of decreasing the uncertainty regions 76 and 78 continues until the uncertainty regions 76 and 78 are one-half the size of the beam width of the scan beams 82 and 84. Thus, the relative orientation between the sensors 66 or 70 and the transmitters 68 or 70 is not important. This is because the information being exchanged is not just the arrival angle of the incoming beam, but is also the departure angle necessary to illuminate the other terminal. Once the uncertainty region 76 or 78 is less than half of the beamwidth, it is certain that a track can be entered since co-alignment will be automatically compensated.

The percentage reduction of the uncertainty regions 76 or 78 for a single round trip scan piece of data is limited by the amount of data that can be packed into a hit.

The example given above separates the uncertainty region 76 and 78 into fifteen scan sections. However, this is by way of a non-limiting example for illustration purposes. In a practical example, ten bits can be provided on the scan beams 82 or 84 for coding. This provides 1024 scan sections for each of the uncertainty regions 76 and 78. Further, each time a scan section is subdivided, it can be subdivided by a different number of times than was previously done. Further, the two uncertainty regions 76 and 78 can be subdivided into different numbers of scan sections. Also, the field-of-view of the sensors 68 and 70 can be the entire field-of-view for the current uncertainty region 76 or 78, and thus do not need to be subdivided as was done in the embodiment discussed above. The example discussed above is a one-dimensional example. However, those skilled in the art will readily recognized that the scan can actually be a two-dimensional scan, where the invention can be used for that type of scan.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method of acquiring alignment between a first terminal and second terminal, said method comprising:

identifying a first uncertainty region that the first terminal is positioned within;
identifying a second uncertainty region that the second terminal is positioned within;
separating the first uncertainty region and the second uncertainty region into a plurality of contiguous scan sections where each scan section is identified by a section code;
transmitting a first scan beam from the first terminal that sequentially scans through the scan sections in the second uncertainty region, said first scan beam being encoded with both an outgoing section code for the particular scan section in the second uncertainty region that the first scan beam is scanning and a return section code that identifies the section decoded from the second scan beam if the first terminal was hit;
transmitting a second scan beam from the second terminal that sequentially scans through the scan sections in the first uncertainty region, said second scan beam being encoded with both an outgoing section code for the particular scan section in the first uncertainty region that the second scan beam is scanning and a return section code that identifies the section decoded from the first scan beam if the second terminal was hit;
receiving the first scan beam by the second terminal when the first scan beam illuminates the section of the second uncertainty region that the second terminal is located;
encoding the second scan beam with the section code from the first scan beam received by the second terminal; and
receiving the second scan beam by the first terminal when the second scan beam scans the section of the first uncertainty region that the first terminal is located where the second scan beam includes the section code for the second terminal so that the first terminal knows the location of the second terminal in the second uncertainty region.

2. The method according to claim 1 further comprising encoding the first scan beam with the section code from the second scan beam received by the first terminal, and receiving the first scan beam by the second terminal when the first scan beam scans the scan section of the second uncertainty region that the second terminal is located where the first scan beam includes the section code for the first terminal so that the second terminal knows the location of the first terminal in the first uncertainty region.

3. The method according to claim 2 further comprising separating the scan section in the first uncertainty region that the first terminal is located into a plurality of scan sections, and separating the scan section in the second uncertainty region that the second terminal is located into a plurality of scan sections.

4. The method according to claim 3 further comprising repeatedly separating the scan section in the first uncertainty region that the first terminal is located into a plurality of scan sections and separating the scan section in the second uncertain region that the second terminal is located into a plurality of scan sections until the size of the first and second uncertainty regions is about one-half of the beamwidth of the first and second scan beams.

5. The method according to claim 4 wherein the first and second scan beams have a beamwidth of 1-20 microradians.

6. The method according to claim 1 wherein separating the first uncertainty region and the second uncertainty region into a plurality of contiguous scan sections includes separating the first uncertainty region and the second uncertainty region into 1024 contiguous scan sections.

7. The method according to claim 1 wherein transmitting the first and second scan beams include scanning the first and second scan beams in two-dimensions.

8. The method according to claim 1 wherein the first scan beam and the second scan beam are optical beams.

9. A method of providing optical alignment between a first terminal and a second terminal so that the first and second terminals can transmit optical data beams to each other, said method comprising transmitting scan beams from the first and second terminals to the other first or second terminal, encoding the scan beams with a section code identifying a scan section that the scan beam is currently scanning, receiving the encoded scan beam by the first or second terminal, encoding the transmitted scan beam with the section code from the received scan beam, and receiving the transmitted scan beam by the first or second terminal to identify the position of the first and second terminals.

10. The method according to claim 9 wherein transmitting the scan beams includes transmitting the scan beams in two-dimensions.

11. A communications system comprising:
a first terminal including a first sensor and a first transmitter, said first terminal being positioned within a first uncertainty region, said first uncertainty region being separated into a plurality of contiguous scan sections where each scan section in the first uncertainty region is identified by a scan code; and
a second terminal including a second sensor and a second transmitter, said second terminal being positioned within a second uncertainty region, said second uncertainty region being separated into a plurality of contiguous scan sections where each scan section in the second uncertainty region is identified by a scan code, said first transmitter transmitting a first scan beam for scanning the second uncertainty region and being encoded with the scan code of the scan section in the second uncertainty region it is currently scanning and said second transmitter transmitting a second scan beam for scanning the first uncertainty region and being encoded with the scan code of the scan section it is currently scanning, said first scan beam also being encoded with the scan code from the second scan beam when the first sensor receives the second scan beam and said second scan beam also being encoded with the scan code from the first scan beam when the second sensor receives the first scan beam so that the first terminal knows the location of the second terminal in the second uncertainty region and the second terminal knows the location of the first terminal in the first uncertainty region.

12. The system according to claim 11 wherein the first scan beam and the second scan beam are optical beams and the first sensor and the second sensor include optical telescopes for receiving the optical scan beams.

13. The system according to claim 11 wherein the first sensor and the second sensor include InGaAs sensor cells.

14. The system according to claim 11 wherein the first transmitter and the second transmitter scan the first scan beam and the second scan beam in two-dimensions in the first and second uncertainty regions.

15. The system according to claim 11 wherein the first and second scan beams have a beam width of about 1-20 microradians.

16. The method according to claim 9 further comprising separating the scan section that the first terminal is located into a plurality of scan sections, and separating the scan section that the second terminal is located into a plurality of scan sections after the position of the first and second terminals is determined.

17. The method according to claim 16 further comprising repeatedly separating the scan section that the first terminal is located into a plurality of scan sections and separating the scan section that the second terminal is located into a plurality of scan sections until the size of the scan section is about one-half of the beamwidth of the scan beams.

18. The method according to claim 17 wherein the scan beams have a beamwidth of 1-20 microradians.

* * * * *